United States Patent [19]

Miyake et al.

[11] Patent Number: 5,349,564
[45] Date of Patent: Sep. 20, 1994

[54] MULTI-PORT RAM HAVING MEANS FOR PROVIDING SELECTABLE INTERRUPT SIGNALS

[75] Inventors: Takashi Miyake; Mitsuru Sugita, both of Hyogo, Japan

[73] Assignee: Mitsubishi Denki Kabushiki Kaisha, Tokyo, Japan

[21] Appl. No.: 731,556

[22] Filed: Jul. 17, 1991

[30] Foreign Application Priority Data

Jul. 24, 1990 [JP] Japan .................. 2-195925

[51] Int. Cl.⁵ .............................. G11B 7/00
[52] U.S. Cl. .................. 365/230.05; 365/195; 365/230.06
[58] Field of Search ............. 365/230.05, 230.06, 365/189.04, 195

[56] References Cited

U.S. PATENT DOCUMENTS

| | | | |
|---|---|---|---|
| 4,535,428 | 8/1985 | Furman | 365/230.05 |
| 4,758,991 | 7/1988 | Ichida | 365/195 |
| 4,956,820 | 9/1990 | Hashimoto | 365/195 X |
| 5,001,671 | 3/1991 | Koo et al. | 365/230.05 |
| 5,036,491 | 7/1991 | Yamaguchi | 365/230.05 X |

FOREIGN PATENT DOCUMENTS 134982  6/1986  Japan ............ 365/230.06

OTHER PUBLICATIONS

Advanced Micro Device 4-90, Apr. 10, 1989 "Am 2130/Am 2140".

Primary Examiner—Benny Lee
Attorney, Agent, or Firm—Townsend and Townsend Khourie and Crew

[57] ABSTRACT

A multi-port RAM has a decoding portion for decoding a plurality of specific addresses for generating interruptions and a selection circuit for selecting some addresses from among the plurality of specific addresses. Since the plurality of addresses are selected for generating interruptions in parallel or in the sequence of time for each generation of an interruption, the data processing capability at the time of generation of interruptions can be improved.

6 Claims, 5 Drawing Sheets

MULTI-PORT RAM HAVING MEANS FOR PROVIDING SELECTABLE INTERRUPT SIGNALS

BACKGROUND OF THE INVENTION

1. Field of the Invention

The present invention relates to a semiconductor multi-port RAM mounted on an information processor.

2. Description of the Prior Art

FIG. 6 illustrates an example of a configuration of an information processor having a multi-port RAM.

An information processor 1 comprises a CPU 2 and a multi-port RAM 3. Multi-port RAM 3 has an interrupt circuit 4 for interrupting CPU 2, a memory control circuit 5, and a memory cell portion 6, i.e., a recording region. An address 9 for interrupt generation is an address in an allotted address region of multi-port RAM 3.

Multi-port RAM 3 has three ports, a port A, a port B, and a port C. Port A is connected to CPU 2, and ports B and C are connected to external information processors 8A and 8B, respectively. Memory control circuit 5 receives requests for access to multi-port RAM 3 from CFU 2 and external information processors 8A and 8B. The access results are then processed and executed by memory control circuits sequentially at a predetermined timing. Ports A, B and C are respectively provided with a data bus, an address bus, and an access requesting line (e.g. a line for a write request signal).

Interrupt circuit 4 is configured as shown in FIG. 7. Interrupt circuit 4 comprises decoding circuits 20 and 21 for decoding a specific address value, FFFF$_H$ input to ports B and C, and circuits 22 and 23 for decoding a writing in a specific address FFFF$_H$, and an OR circuit 24. An output signal IRQ (DPRAM) of OR circuit 24 is imparted to CPU 2 shown in FIG. 6, as an interrupt signal. When a writing in the multi-port RAM is performed by means of port B or C, with write signals WR(B) or WR(C), respectively, and when the address to which the writing has been effected is a specific address a i.e., FFFF$_H$, an interrupt is generated for CFU 2, and this address is, for instance, a final address 9 of RAM 6.

A description will now be given of the operation of information processor 1 shown in FIG. 6. As a method of generating an interrupt by the external information processors 8A and 8B at the time of writing to multi-port RAM 3, when an access signal WR of either of the external information processor 8A or 8B is input to information processor 1, information processor 1 generates an interrupt to CPU 2 if an address to which a writing is effected at the time of that writing operation is a specific address for generating an interrupt.

However, if an interrupt due to writing in multi-port RAM 6 is effected with respect to only one specific address, e.g., "FFFF$_H$", there arises a need to conduct address adjustment in such as data transmission from the outside. As a result, it has been impossible to effect complicated processing involved in the processing of a generated interrupt, so that the information processing capability has been restricted.

SUMMARY OF THE INVENTION

Accordingly, an object of the present invention is to provide a multi-port RAM for use in an information processor whose information processing capability is rendered flexible by using a plurality of addresses for an interrupt generated by writing in a multi-port RAM, thereby overcoming the above-described drawback of the conventional art. To this end, in accordance with the present invention, there is provided a multi-port RAM connected to a CPU and including an interrupt circuit portion, a memory portion, and a plurality of ports for data transmission in correspondence with external devices, wherein the interrupt circuit portion has a decoding portion for decoding a plurality of specific addresses for generating interrupts via the plurality of ports, and a selection circuit for selecting from among the plurality of specific addresses.

More specifically, a number of decoding circuits, each decoding a specific address, are selected by a selection circuit and the operation of writing in the specific addresses selected is effected. At that juncture, an interrupt generating signal is generated with respect to the CPU, and the interrupt operation by either port B or port C is accepted positively.

The above and other objects, features and advantages of the invention will become more apparent from the following description when taken in conjunction with the accompanying drawings.

DESCRIPTION OF THE PREFERRED EMBODIMENT

Figure 1:
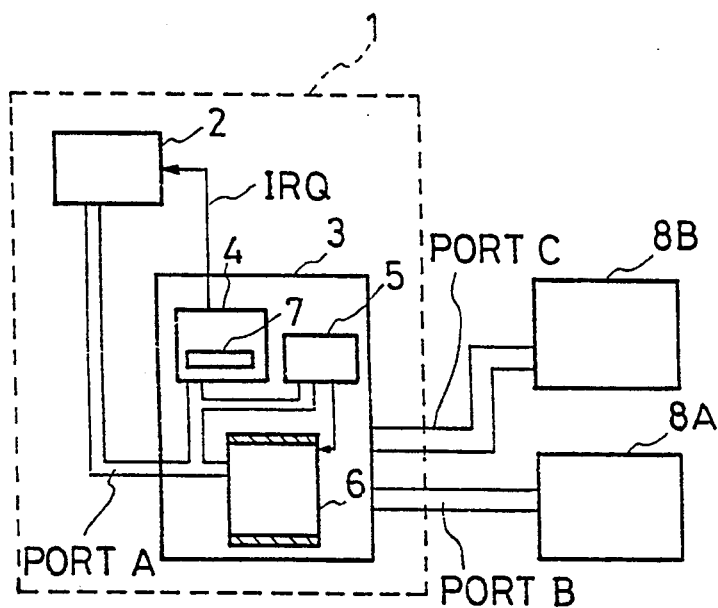
FIG. 1 is a diagram illustrating a configuration of an information processor in accordance with an embodiment of the present invention.

FIG. 1 illustrates a configuration of an information processor to which an embodiment of the present invention is applied.

In FIG. 1, an information processor 1 comprises a CPU 2 and a multi-port RAM 3. Multi-port RAM 3 includes an interrupt circuit 4 having an interrupt mode/status register 7 for selecting the specific address to generate interrupts and holding the status of an interrupt generated, a memory control circuit 5, and a memory 6. A port A couples multiport RAM 3 to CPU 2, a port B couples multiport RAM 3 to an external device 8A, and a port C couples multiport RAM 3 to an external device 8B. An IRQ line carries an interrupt signal to CPU 2.

Interrupt circuit 4 has decoding circuits 25-30 for channels 1-3 of Ports A and B, and three selection circuits 13, as shown in FIGS. 3(b)-3(g) and 4. Namely, in FIGS. 3(a)-3(g), with respect to the port B the interrupt circuit 4 has the following: in FIG. 3(b), decoding circuit 25 for decoding a specific address value "0000$_H$" which is a leading address of the memory 6, on address lines and a specific address AD0–AD15 for generating an interrupt, and its decode output is 8B; in FIG. 3(c) decoding circuit 26 for decoding a specific address value "FFFF$_H$" which is a final address of the memory 6, on address lines AD0–AD15 and a specific address for generating an interruption, and its decode output is eB; and in FIG. 3(d), decoding circuit 27 for decoding an address space allotted in the memory 6 as a specific address value (space) for generating an interrupt, and its decode output is aB. With respect to the port C, insert circuit 4 has a decoding circuit 28 (see FIG. 3(e)) for decoding a specific address value "0000$_H$" which is a leading address of the memory 6 on address line AD0–AD15 and a specific address for generating an interrupt and its decode output is sC, a decoding circuit 29 (see FIG. 3(f)) for decoding a specific address value "FFFF$_H$" which is a final address of the memory 6 on address lines ADO–AD15 and a specific address for generating an interrupt, and its decode output is ac, and a decoding circuit 30 (see FIG. 3(g)) for decoding an address space allotted in the memory 6 as a specific address value (space) for generating an interrupt, and its decode output is ac. Reference number 80 in FIGS. 3(d) and 3(g) designates a pre-circuit for decoding an address allotted in the multi-port RAM.

Figure 2:
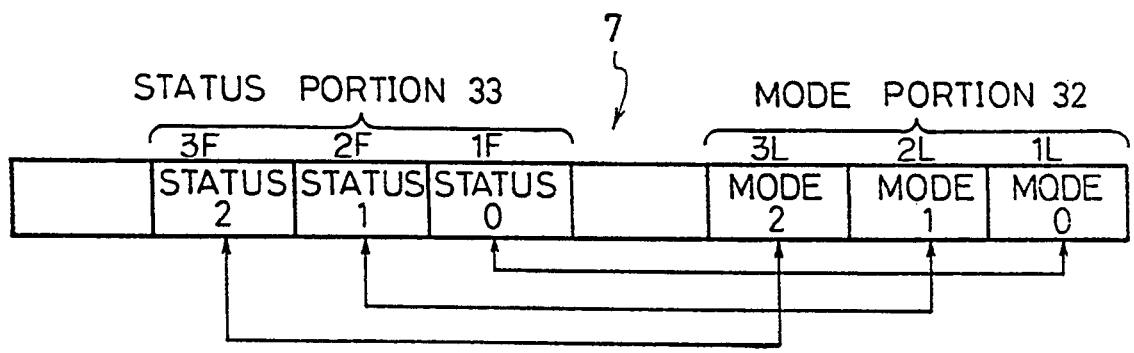
FIG. 2 is a detailed diagram of an interrupt mode/status register in accordance with the embodiment.
Figure 3:
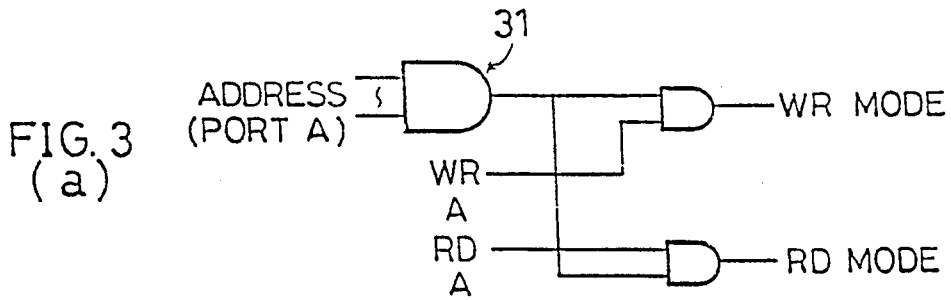
FIGS. 3(a) to 3(g) are diagrams illustrating a configuration of a decoding circuit in accordance with the embodiment.
Figure 3:
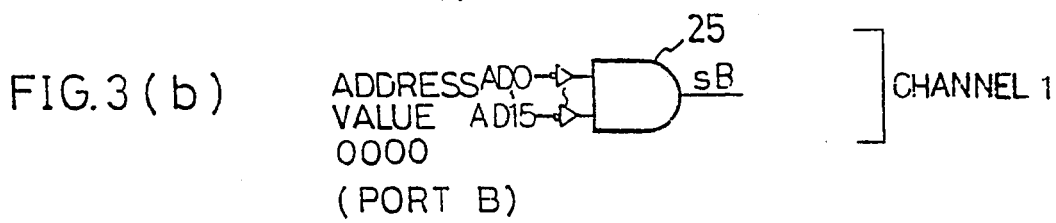
Figure 3:
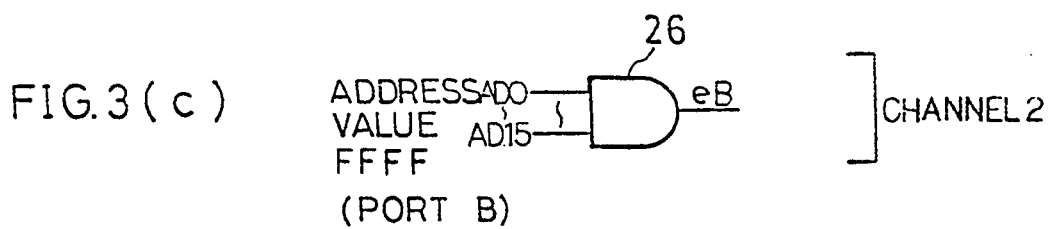
Figure 3:
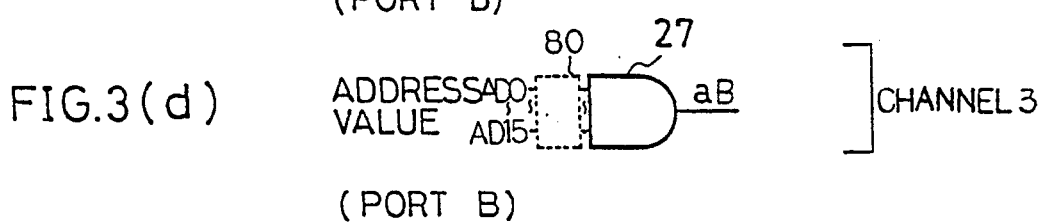
Figure 3:
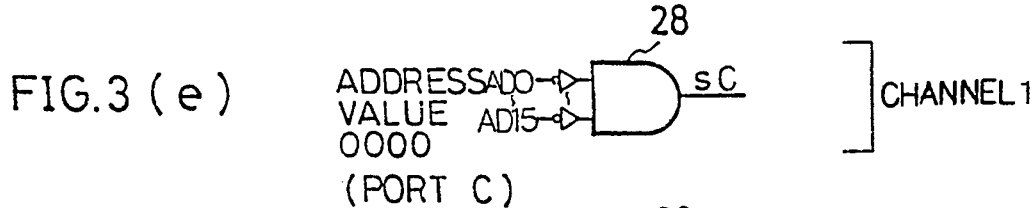
Figure 3:
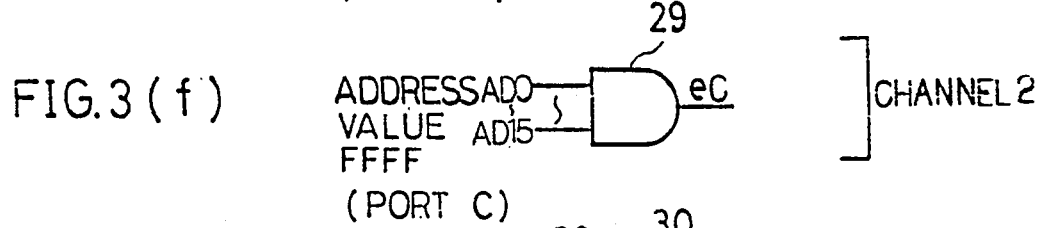
Figure 3:
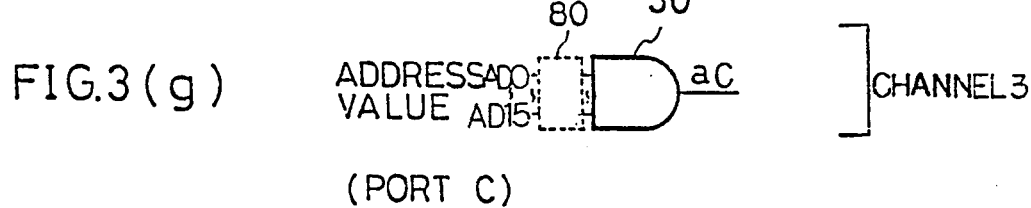

In FIG. 3(a), a write signal for writing to interrupt mode/status register 7 of FIG. 1 (for port A) from CPU 2 is WRMODE, a read signal is RDMODE for reading data in interrupt/mode status register 7 of FIG. 2 from the CPU shown in FIG. 1, and a decoding circuit 31 decodes an address on Port A. The state of the WRMODE signal depends on the output of decoding circuit 31 and a WRA signal, and the state of the RD MODE signal depends on the output of decoding circuit 31 and a RD A signal.

The channels 1, 2, and 3 respectively set independent addresses for interruption, and the three channels are capable of being operated in parallel.

Figure 4:
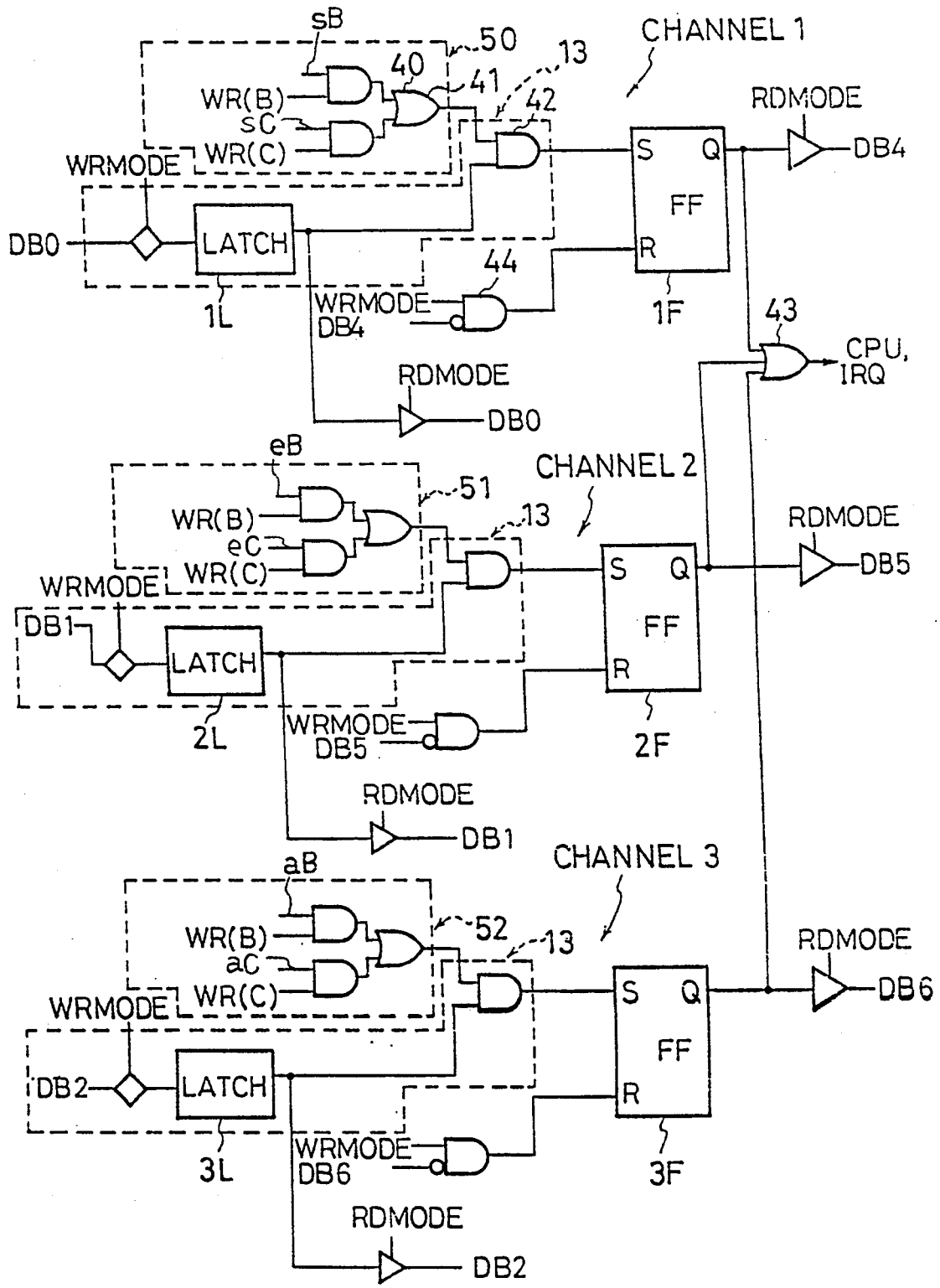
FIG. 4 is a diagram illustrating a configuration of an interrupt circuit in accordance with the embodiment.

Furthermore, in FIG. 2, the interrupt mode/status register 7 includes a status portion 33 and a mode portion 32. The mode portion 32 corresponds to latches (LATCH) 1L–3L for the respective channels 1–3 shown in FIG. 4. Specifically, values of modes 0–2 of the mode portion 32 correspond to the values of the latches 1L–3L of FIG. 4. Meanwhile, the status portion 33 corresponds to flip-flops (FF) 1F–3F shown in FIG. 4. Specifically, values of statuses 0–2 of the status portion 33 correspond to output values Q of the FFs 1F–3F. The WRMODE signal becomes active to write data from CPU 2 of FIG. 1 to interrupt mode/status register 7 of FIG. 2. The data is from data bus lines DB0–DB2 and DB4–DB6, which carry data bus signals in information processor 1 of FIG. 1 included in Port A, and written to 1L to 3L and 1F to 3F, respectively. The RD MODE signal becomes active to read data in register 7 from CPU 2 of FIG. 1 to data bus lines DB0–DB2 and DB4–DB6, respectively. Data "1" is set in 1F to 3F only when data "1" is already set in 1L to 3L and the outputs of logic circuits 50, 51, and 52 become active. FIG. 4 constitutes the selection circuit 13 for selecting specific addresses.

Modes 0, 1, and 2 are valid and selected when the bits of the modes 0, 1, and 2 are respectively 1. In this case, either a plurality of modes or a single mode may be valid. In addition, as for the statuses, the state of an interrupt generated is accepted only with respect to the status corresponding to the mode selected.

A description will now be given of the operation. For example, when writing is effected in an address "0000$_H$", which is one of the specific addresses, by an external information processor 8A via port B, signal sB and WR(B) are active. Thus, an AND circuit 40 for decoding the writing in the specific address "0000$_H$" becomes active, and an OR circuit 41 also becomes active. At this time, in a case where this specific address "0000$_H$" has already been selected by the mode register 1L (in the H state) as an address for generating an interrupt, an AND circuit 42 also becomes active. As a result, the generation of an interrupt is latched by the status register 1F, and a signal IRQDPRAM also becomes active, thereby allowing the CPU 2 to generate an interrupt.

If the specific address "0000$_H$" is not selected as the specific address for generating an interrupt by setting a mode register when said writing to the address "0000$_H$" is performed, the AND circuit 42 does not become active at that time, so that an interrupt is not generated.

With respect to the other two addresses for generating an interrupt, a similar operation is effected for the channels 2 and 3 as well using signals eB and aB, respectively. In addition, in writing in the status register 1F (2F, 3F), only "0" can be written by means of a circuit 44.

The above-described operation is effected with respect to writing by the external information processor 8B (on the port C side) as well with the write signal being signal WR(C). Signal sC is active when address "0000$_H$" is written to, signal sC is active when address "FFFF$_H$" is written to, and signal aC is active when the address determined by decoding circuit 30 is active.

In addition, when an interrupt occurs in a case where a plurality of addresses for generating an interrupt have been selected (with both the mode registers 1L, 2L set in the H state), it is possible to ascertain which interrupt has occurred by reading the status registers 1F, 2F.

Thus, information processor 1 generates an interrupt by means of write signals to a specific address of the multi-port RAM 3 from external information processors 8A, 8B. There are three conditions for generating the interrupt, that is, when a writing operation is effected in an area of the multi-port RAM (the writing is effected somewhere in the whole area of the multi-port RAM), when it is effected in the leading address "0000$_H$" of the multi-port RAM, and when it is effected in the final address "FFFF$_H$" of the multi-port RAM. The selection of the conditions for generating an interrupt and the holding of the status of each interrupt generated are recorded in the interrupt mode/status register 7. As a result, CPU 2 controls the generation of interrupts with reduced waiting time and recognizes the state of generation of interrupts, thereby speedily effecting data processing.

Figure 5A:
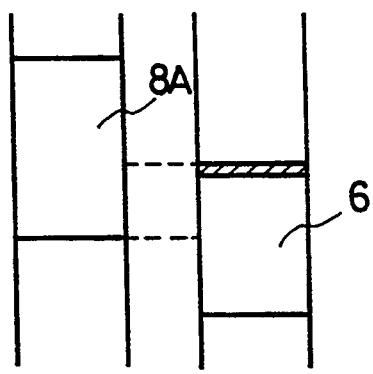
FIGS. 5(a) and 5(b) are diagram illustrating RAM areas in accordance with the embodiment.
Figure 5B:
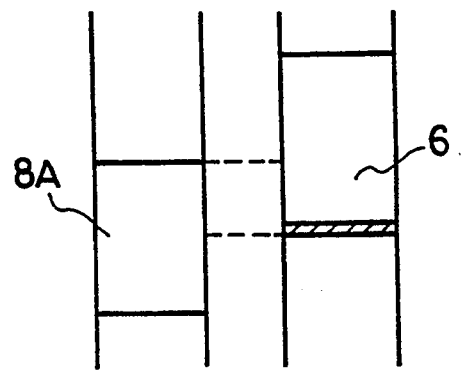
Figure 6:
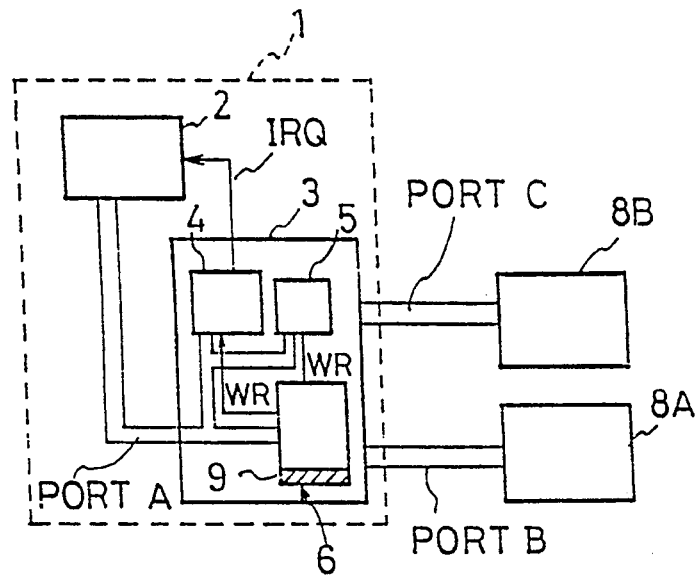
FIG. 6 is a diagram illustrating a configuration of an information processor in accordance with the prior art.
Figure 7:
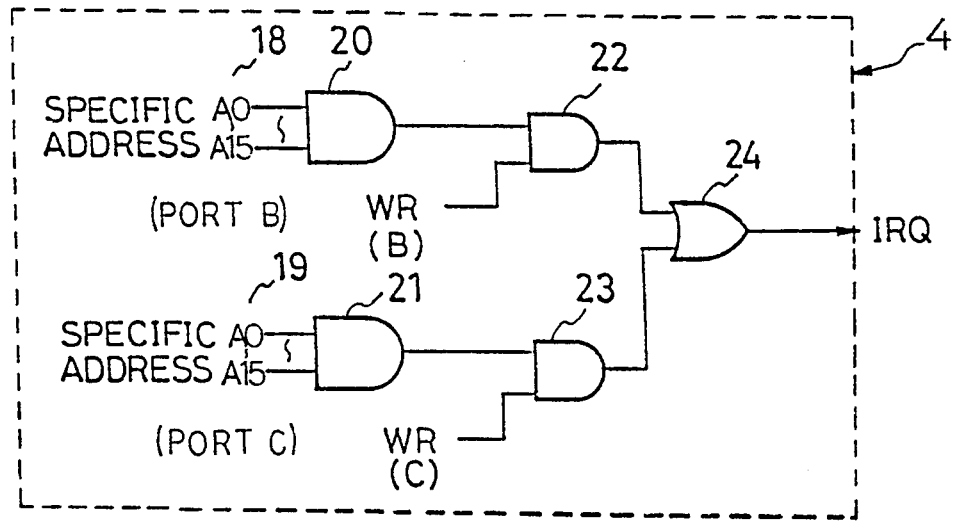
FIG. 7 is a diagram illustrating a configuration of an interrupt circuit in accordance with the prior art.

In addition, as shown in FIGS. 5(a) and 5(b), in a case where the transmission of data from external information processors 8A, 8B to information processor 1 is made possible with the RAM areas of external information processors 8A, 8B and the RAM area of memory 6 of information processor 1 being overlapped with each other, it is possible to adopt an arrangement in which portions of the respective RAMs are made to overlap with each other. In such a case, with respect to a in a case where the leading address "0000$_H$" of the memory 6 overlaps and b in a case where the final address "FFFF$_H$" of the memory 6 overlaps, if the mode provided is such that the afore-mentioned three conditions for generating an interrupt are possible, it is possible to generate an interrupt in an area where memory maps overlap (writing in hatched portions shown in FIGS.

5(a) and 5(b)), or generate an interrupt in an area where the memory maps do not overlap.

In other words, in accordance with the embodiment of the present invention, it is possible to control the generation of interrupts due to the writing in the multi-port RAM in a complicated manner, and generate interrupts in a multiplex manner. In addition, it is possible to ascertain the state of generation of interrupts on each such occasion. Accordingly, it is possible to effect finer control and improve the information processing capability. In addition, since interrupts can be generated only by the processing of writing in the multi-port RAM, the load on software is reduced.

If the afore-mentioned three conditions are adopted, i.e., if writing is effected in the RAM area of the multi-port RAM, in the leading address, and the final address, even if the RAM area of an external information processor and the RAM area of the multi-port RAM are made to overlap with each other, it is possible to allow an interrupt to be generated without fail. In addition, at the time when the memory is expanded, it is possible to cope with the expansion despite the fact that a plurality of interrupt generating addresses are provided.

What is claimed is:

1. A multi-port RAM coupled to a central processing unit (CPU), said multi-port RAM comprising:
    a memory having a plurality of storage locations, each storage location accessed by a unique address in a memory address space;
    a plurality of ports for transmitting data between external devices and said memory; and
    an interrupt circuit, coupled to said plurality of ports, to said memory, and to the CPU, for generating interrupt signals to the CPU, when specific storage locations in said memory address space are written to via said plurality of ports, said interrupt circuit comprising:
    decoding means for decoding a plurality of specific addresses corresponding to said specific storage locations in said memory address space to generate said interrupt signals; and
    a selection circuit, coupled to said decoding means, for selecting one of said generated interrupt signals to interrupt the CPU.

2. The multi-port RAM according to claim 1 wherein said interrupt circuit further comprises an interrupt mode/status register having a mode portion and a status portion.

3. The multi-port RAM according to claim 2 wherein said mode portion of said interrupt mode/status register corresponds to outputs of latches of said selection circuit and wherein said status portion corresponds to outputs of flip-flops coupled to said selection circuit.

4. The multi-port RAM according to claim 1, wherein when one of said interrupt signals is generated through one of said plurality of ports, said selection circuit selects at least one of said plurality of specific addresses as an interrupt generating address.

5. The multi-port RAM according to claim 1, wherein said plurality of specific addresses comprise a leading address corresponding to a first storage location in said memory address space and final address corresponding to a last storage location in said memory address space.

6. A multi-port RAM coupled to a central processing unit (CPU), said multi-port RAM comprising:
    a memory having a plurality of storage locations, each storage location accessed by a unique address in a memory address space;
    a plurality of ports, coupled to said memory and to external devices, for transmitting data between said external devices and said memory; and
    an interrupt circuit, coupled to said plurality of ports, to said memory, and to the CPU, for generating interrupt signals to the CPU, said interrupt circuit comprising:
    decoding means for decoding a plurality of predetermined addresses corresponding to said specific storage locations in said memory address space to generate said interrupt signals; and
    a selection circuit, coupled to said decoding means, for selecting one of said generated interrupt signals to interrupt the CPU;
    whereby said interrupt circuit generates said interrupt signals when said decoding circuit decodes one of said plurality of predetermined addresses sent to said interrupt circuit via one of said plurality of ports.

* * * * *